United States Patent
D'Amora

(10) Patent No.: US 8,564,617 B2
(45) Date of Patent: Oct. 22, 2013

(54) ACCELERATED VOLUME RENDERING

(75) Inventor: Bruce David D'Amora, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 869 days.

(21) Appl. No.: 12/686,222

(22) Filed: Jan. 12, 2010

(65) Prior Publication Data
US 2011/0169830 A1 Jul. 14, 2011

(51) Int. Cl.
*G06T 15/00* (2011.01)

(52) U.S. Cl.
USPC ............ 345/624; 345/419; 345/623; 345/627

(58) Field of Classification Search
USPC ....................................................... 345/624
See application file for complete search history.

(56) References Cited

U.S. PATENT DOCUMENTS

| | | | |
|---|---|---|---|
| 5,847,711 A * | 12/1998 | Kaufman et al. | 345/424 |
| 6,211,884 B1 * | 4/2001 | Knittel et al. | 345/424 |
| 6,243,098 B1 * | 6/2001 | Lauer et al. | 345/424 |
| 6,262,740 B1 * | 7/2001 | Lauer et al. | 345/424 |
| 6,674,430 B1 * | 1/2004 | Kaufman et al. | 345/419 |
| 6,901,389 B1 | 5/2005 | Madison et al. | |
| 7,109,989 B2 * | 9/2006 | Bissell et al. | 345/424 |
| 7,133,041 B2 * | 11/2006 | Kaufman et al. | 345/419 |
| 7,209,136 B2 * | 4/2007 | Grau | 345/419 |
| 7,298,377 B2 * | 11/2007 | Fossum et al. | 345/584 |
| 7,327,363 B2 * | 2/2008 | Fujiwara et al. | 345/424 |
| 7,471,291 B2 * | 12/2008 | Kaufman et al. | 345/424 |
| 7,538,767 B2 * | 5/2009 | Fossum et al. | 345/426 |
| 7,825,924 B2 * | 11/2010 | Matsumoto | 345/419 |
| 7,839,404 B2 * | 11/2010 | Bordoloi et al. | 345/424 |
| 8,040,352 B2 * | 10/2011 | Busch et al. | 345/427 |
| 8,189,002 B1 * | 5/2012 | Westerhoff et al. | 345/426 |
| 8,203,553 B2 * | 6/2012 | Schwarzer et al. | 345/419 |
| 2004/0125103 A1 * | 7/2004 | Kaufman et al. | 345/419 |
| 2007/0206008 A1 * | 9/2007 | Kaufman et al. | 345/424 |
| 2009/0128562 A1 * | 5/2009 | McCombe et al. | 345/427 |
| 2009/0262132 A1 * | 10/2009 | Peterson et al. | 345/619 |
| 2010/0033493 A1 * | 2/2010 | Nutter et al. | 345/589 |
| 2010/0231589 A1 * | 9/2010 | Salsbury et al. | 345/426 |
| 2011/0074766 A1 * | 3/2011 | Page et al. | 345/419 |

FOREIGN PATENT DOCUMENTS

WO WO0250776 A1 6/2002

* cited by examiner

*Primary Examiner* — M Good Johnson
(74) *Attorney, Agent, or Firm* — Michael J. Buchenhorner; Anne Dougherty

(57) ABSTRACT

Performing accelerated volume rendering of a scene in a computer system by: loading volumetric data into a first part of a system memory, the volumetric data represented as a three-dimensional array of data values; determining intersection points of each of a set of sample rays cast through the scene and intersecting the three-dimensional array, wherein the intersection points are determined as a function of sample times from beginning to end; using the intersection points, computing a subset of the three-dimensional array for placement into local storage; loading the subset of three-dimensional array into the local storage; and repeating the determining, computing, and loading acts for all sample times from beginning to end for all sets of sample rays cast by the processor device.

26 Claims, 8 Drawing Sheets

Area of volume intersected by ray frustum

Determine area encompassed by intersection intersection of 4 rays with volume determines area for which addresses need to be computed 4 rays being cast from eye through display plane into volume

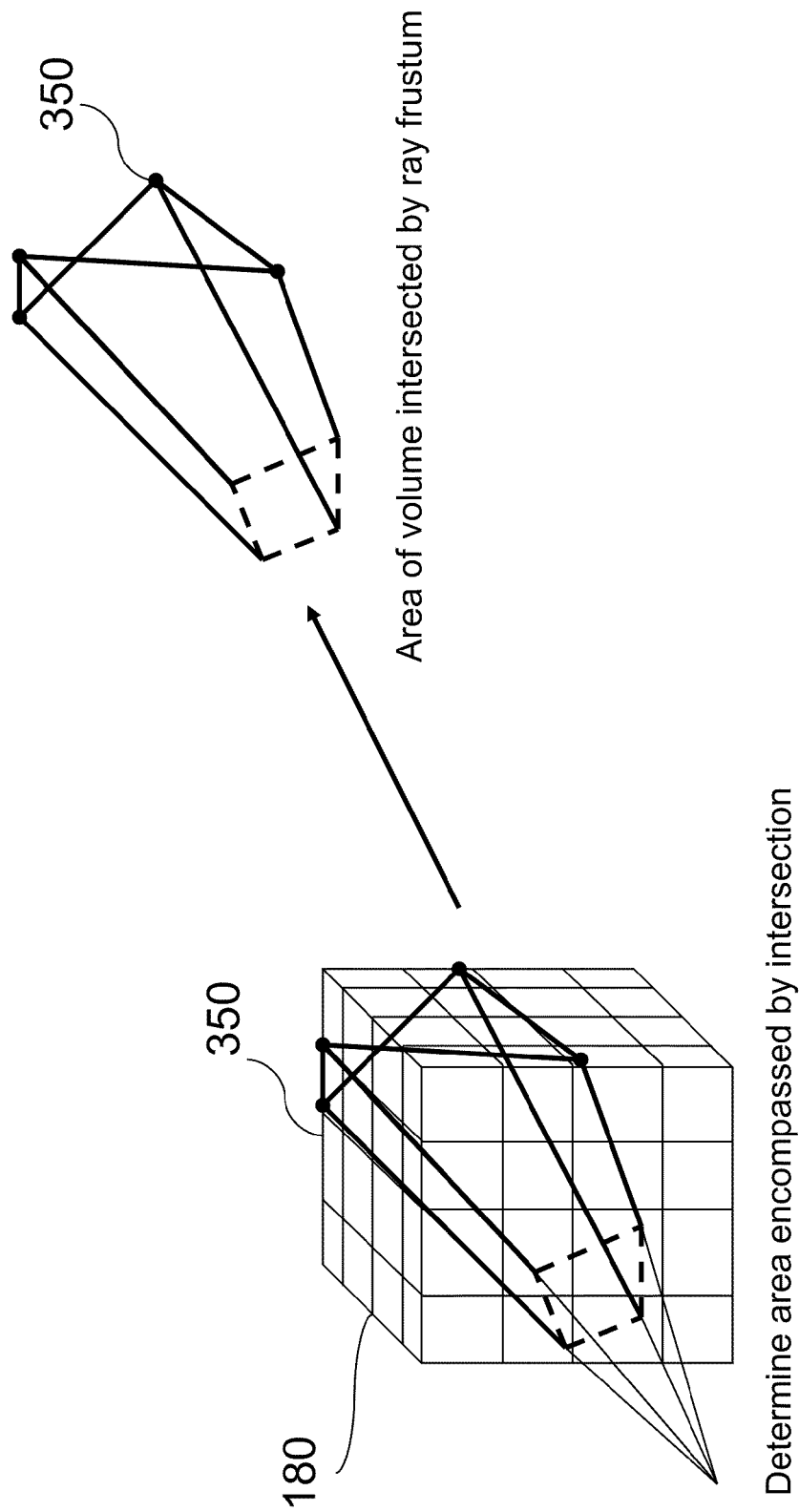
Figure 3. intersection of 4 rays with volume determines area for which addresses need to be computed

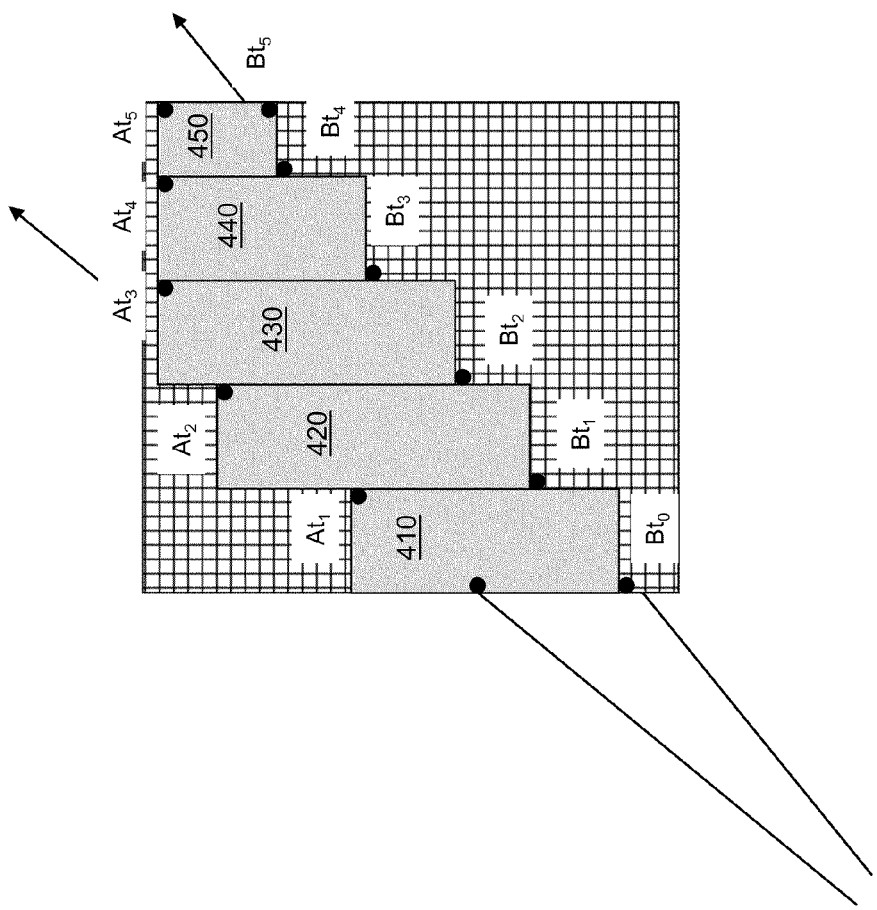
FIG. 4 2D case for computing addresses

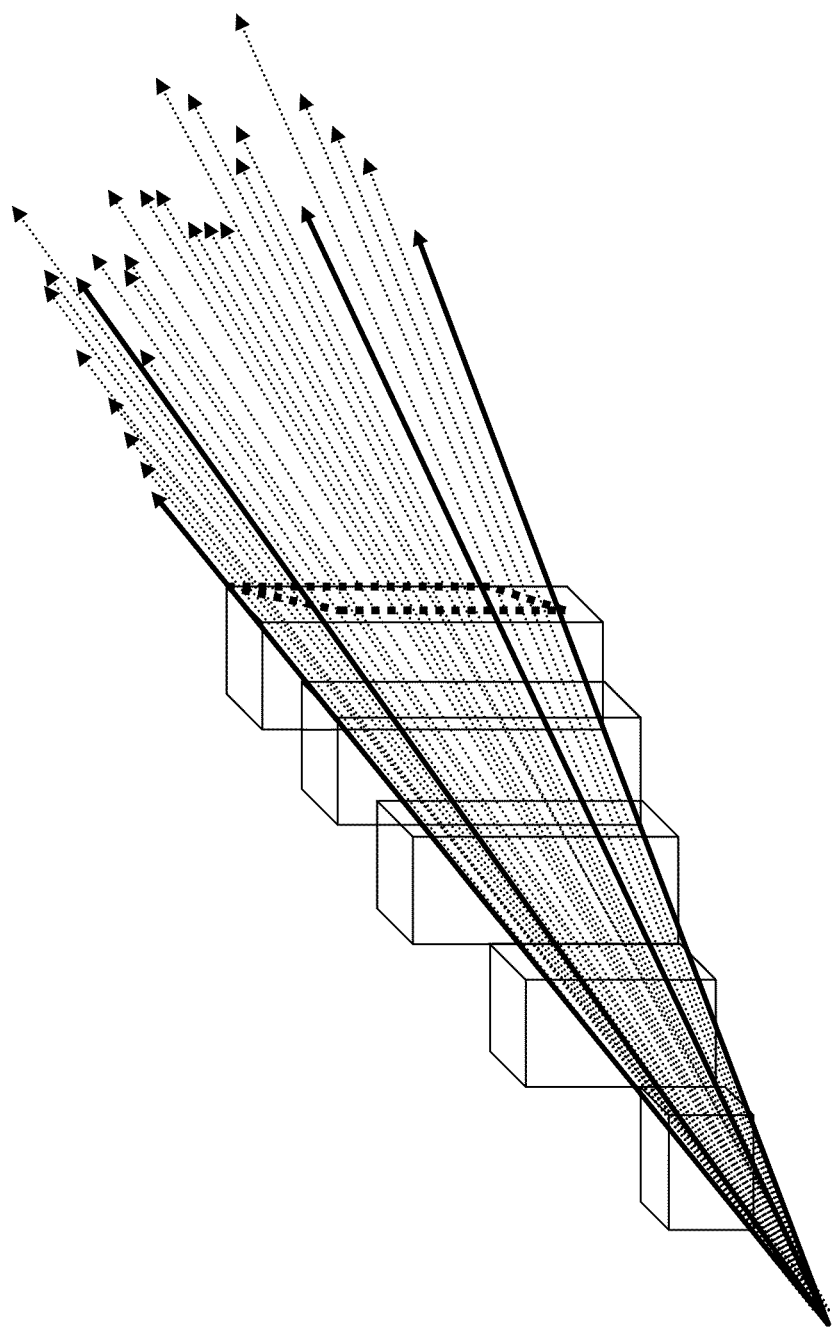
Figure 5. Casting additional rays

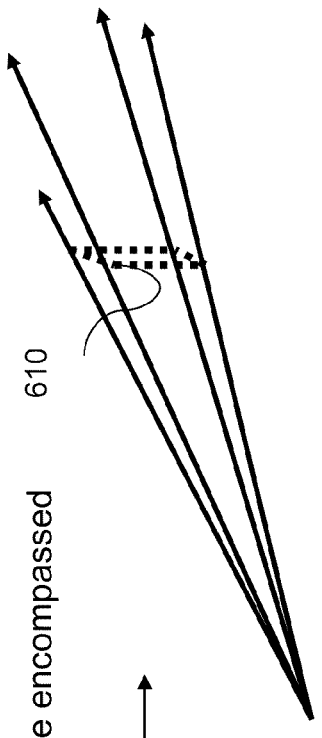
Fig. 6b Region of volume encompassed by frustum
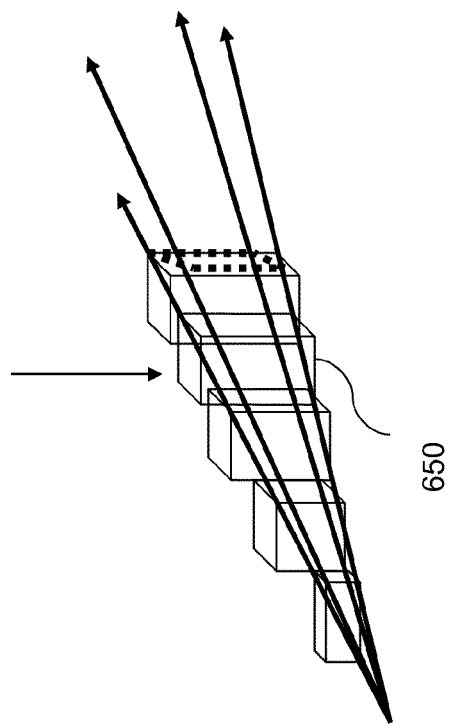
Fig. 6c Area of volume intersected by ray frustum
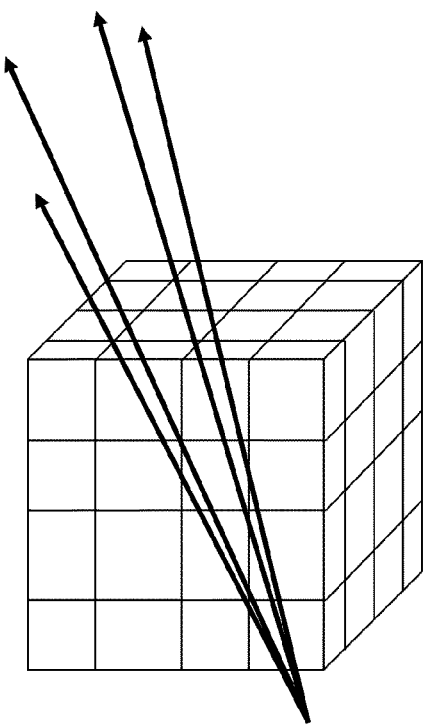
FIG. 6a 4 rays are cast at edges of frustum

ACCELERATED VOLUME RENDERING

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of volume rendering on a cell broadband engine or more generally relates to accelerated volume rendering on cache-less systems.

BACKGROUND OF THE INVENTION

Volume rendering is a visualization technique that renders volumetric data (three-dimensional data). A voxel is an element of volumetric data. The term is a concatenation of the first syllables of "volume" and "picture element," analogous to the two-dimensional term pixel made from "picture" and "element." The volumetric data can be acquired from medical scanners, seismic acoustic collection devices, or data generated by algorithmic methods on a computer system. Volume rendering enables the visualization of sampled functions of three spatial dimensions by computing 2-D projections of a colored semitransparent volume. Volume rendering is distinguished from surface rendering such that a volume contains both exterior surface characteristics and internal characteristics. Currently, the major application areas for volume rendering are medical imaging and seismic interpretation.

Volume rendering can be accomplished using a variety of techniques but generally the techniques fall into two categories: direct or indirect methods. Direct methods are distinguished from indirect methods by how they interpret the data collected. Examples of a direct method is ray casting which selects voxels from the data along a ray cast from the viewing position and traversing the volume, blends them and then assigns them to a particular pixel location on the display system. Ray casting (also known as ray tracing, or volume ray casting) is a method used to render high-quality images of objects. Most ray tracing algorithms are implemented on systems with preemptive multi-tasking, virtual memory management, and multi-level cache, because as the rays traverse the data they typically jump to non-contiguous memory locations resulting in a lot of cache misses.

Indirect methods such as marching cubes look for specific values in the volumetric data and then try to extract a set of voxels with those values. If the exact values do not exist in the data, the algorithm looks for voxels with values that are less than and greater than the requested value and interpolates between both voxel points to compute a new point for the requested value. The points are then connected to form a set of triangles which are sorted based on distance from the viewer then rendered to the computer display as filled surfaces. This is also known as isosurface extraction. These two methods differ not only in how they examine the volumetric data, but in how they render the volumetric data. Both methods result in various performance impacts such as cache misses, page faults, and task switching.

Each category of volume rendering techniques has its own advantages and disadvantages. Because direct methods deal with the entire volume at once they can include all the different structures that are represented by the volumetric data when creating the rendered view for display. Direct methods also allow the viewer to highlight different features within the volumetric data, without totally eliminating the rendering of other features, by altering how the voxels are blended together during the rendering process. For example, a transparent or translucent structure can be viewed at the same time as the structure within the transparent structure is highlighted. The functions that control how voxels are blended together are called transfer functions. Changing these functions may result in visual effects such as highlighting a blood vessel instead of muscle tissue. Finally, with direct volume rendering the rendered data has an "interior," i.e. if you pass a cut plane through it there is rendered data in the newly exposed surface.

In contrast to direct methods, indirect methods render only a surface, i.e. internal data is lost. A serious drawback is that only one surface at a time can be extracted. For example, if one wishes to highlight a blood vessel or other tissue, one must first revert to the original data and extract an entirely different surface—this is an expensive process. The one advantage that indirect methods have enjoyed is that they produce a surface that can be used for collision detection. This is particularly useful in virtual endoscopic procedures, for example, virtual colonoscopy. Even so, direct methods do allow path navigation along centerlines, even though there is no explicit surface with which to detect a collision.

Direct methods are predominant today and among direct methods, ray casting is by far the most popular and advantageous, but also the most computationally intensive. Ray casting of volumetric data entails casting a ray (i.e., a directional line) from the eye (through a camera lens) through a projection plane depicted by a two-dimensional display and following the directional line through a virtual three-dimensional grid encompassing the volume in the scene. A parametric equation representing the ray from the eye or the user's viewpoint is mathematically represented by the computer application. The application can also mathematically represent the six sides of a box encompassing the volumetric data (the bounding box). The application then computes the intersection of the ray with the sides of the bounding box.

With the emergence of multi-core computer architectures, microprocessor performance has increased to a point where ray casting can practically be employed for real-time rendering of volumetric data. Multi-core processors based on industry standard micro architectures typically have support for virtual memory management, hardware memory caches, and pre-emptive multitasking. In this case, access to volumetric data by the arithmetic logic units of the processor is managed as part of the hardware support that is in place to support the memory hierarchy. This implies that computations are performed on data that has been loaded into very fast register memory; data not in very fast register memory is ideally in fast cache memory; data not in fast cache memory is in slower system memory; and finally data not in system memory is on disk or some other permanent memory storage medium.

It is noted that there may be several levels of cache each being larger and slower than the preceding level. Modern computer systems hardware will check level 1 first for data, then level 2, then level 3. If data is not found in any of these levels, it must be loaded from system memory. This is an expensive operation because the time latency of moving data from system memory to L3, L2, and L1 cache can be many clock cycles. During this time, the microprocessor arithmetic unit can sit idle, wasting computer resources and degrading application performance.

The process of loading volumetric data into registers where the arithmetic logic units (ALU) can perform operations on the volumetric data is essentially handled by the hardware. The problem is that if data is not in register memory it must be fetched from cache. If it is not in cache it must be loaded into cache from main memory and if it is not in main memory it must be loaded from disk. This multi-level memory hierarchy makes it difficult to control performance as tracing a ray from the eye through the volume results in many accesses to non-contiguous locations in memory and hence increased probability that data will not be in one of the aforementioned memory locations.

In non-traditional architectures such as the Cell/BE (Cell Broadband Engine Architecture) or Graphics Processing Units (GPU), there is less sophisticated hardware support for multi-level memory hierarchy. The programmer must manage the movement of data from one level of memory to another. The advantage is predictability in response and overall performance, but the disadvantage is that more programming is required to explicitly manage data movement. This tradeoff is being made by today's microprocessor architects because the next generation of applications is dependent on real-time, predictable responses. Additionally, the overall performance of the next generation of microprocessors can be increased substantially by providing less hardware support to manage memory and more to manage computation. Even so, the programmability must be addressed. This same set of circumstances applies to commodity graphics processing units (GPUs) being promoted by AMD, Intel, and nVidia for compute intensive applications such as volume rendering.

In the case of direct volume rendering using ray casting, the algorithm that is used normally accesses data (voxels) from non-contiguous memory locations. In traditional hardware the application would just request the data and the hardware would automatically fetch it from one memory location or another. In the case of GPUs (graphics processing unit), DSPs (digital signal processors), or Cell/BE there is no hardware support for this. To further complicate programmability, memory close to the computation units is usually very small, i.e. too small to store an entire volume of data. The algorithm and programmer must address this in an intelligent manner to achieve the highest performance.

One solution to this problem is to access the data on demand. Essentially, as the ray or rays cast from the eye are extended through the volume (for all $0 \leq t \leq 1$), the program computes the address in memory of the next required data location and fetches it from memory. This will definitely result in many small accesses to non-contiguous memory locations and the overhead of these accesses, in the form of cache miss latency, will likely impact overall volume rendering performance. Additionally, the computational units will be idle for a greater percentage of the time as they wait for the next small piece of data, therefore processor utilization will be lower than ideal.

Another solution includes selecting a larger region of the volume data surrounding the x, y, z position of the ray at any point in time t to load into memory and working with that region. It is highly likely that elements of a particular region may be needed to process subsequently cast rays. In this case, a software caching scheme might be employed to keep frequently used data closer to the arithmetic logic units (ALUs). This approach provides some of the advantages of a traditional microprocessor, but has several key disadvantages that make it less than an ideal solution:

(1) Some portion of fast access memory must be reserved to cache data.

(2) Some portion of fast access memory must be used to store code that manages this software cache.

(3) Access to data is not immediate, i.e. a caching scheme and the logic that supports it must be invoked. Ultimately this will lead to performance challenges, e.g. if data is not in software cache, a cache miss will be issued and additional logic is used to go fetch the data from the next level of memory in the hierarchy.

SUMMARY OF THE INVENTION

Briefly, according to an embodiment of the invention a method for performing accelerated volume rendering of a scene in a computer system includes steps or acts of: loading volumetric data into a first part of a system memory, the volumetric data represented as a three-dimensional array of data values; determining intersection points of each of a set of sample rays cast through the scene and intersecting the three-dimensional array, wherein the intersection points are determined as a function of sample times from beginning to end; using the intersection points, computing a subset of the three-dimensional array for placement into local storage; loading the subset of three-dimensional array into the local storage; and repeating the determining, computing, and loading acts for all sample times from beginning to end for all sets of sample rays cast by the processor device.

According to another embodiment of the present invention, a system for performing accelerated volume rendering of a scene in a computer system includes: a system memory for storing volumetric data; and a processor device operatively coupled with the system memory. The processor device is operable for: loading volumetric data into a first part of the system memory, the volumetric data represented as a three-dimensional array of data values; determining intersection points of each of a set of sample rays cast through the scene and intersecting the three-dimensional array, wherein the intersection points are determined as a function of sample times from beginning to end; using the intersection points, computing a subset of the three-dimensional array for placement into local storage; loading the subset of three-dimensional array into the local storage; and repeating the determining, computing, and loading acts for all sample times from beginning to end for all sets of sample rays cast by the processor device. The system may also include an imaging device.

According to another embodiment of the present invention, a computer readable storage medium includes program instructions for performing accelerated volume rendering of a scene in a computer system by: loading volumetric data into a first part of a system memory, the volumetric data represented as a three-dimensional array of data values; determining intersection points of each of a set of sample rays cast through the scene and intersecting the three-dimensional array, wherein the intersection points are determined as a function of sample times from beginning to end; using the intersection points, computing a subset of the three-dimensional array for placement into local storage; loading the subset of three-dimensional array into the local storage; and repeating the determining, computing, and loading acts for all sample times from beginning to end for all sets of sample rays cast by the processor device.

According to another embodiment of the present invention, a method for performing accelerated volume rendering can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which:

FIG. 3 an intersection of four rays with a volume used to determine an area for which addresses need to be computed; according to an embodiment of the present invention;

FIG. 4 shows a 2D case for computing addresses, according to an embodiment of the present invention;

FIG. 5 shows a pictorial representation of casting additional rays, according to an embodiment of the present invention;

FIG. 6a shows the initial four rays cast at the edges of the frustum, according to an embodiment of the present invention;

FIG. 6b shows the region of the volume intersected by the frustum, according to an embodiment of the present invention;

FIG. 6c shows the area of the volume encompassed by the frustum, shown as bounding boxes, according to an embodiment of the present invention

Figure 1:
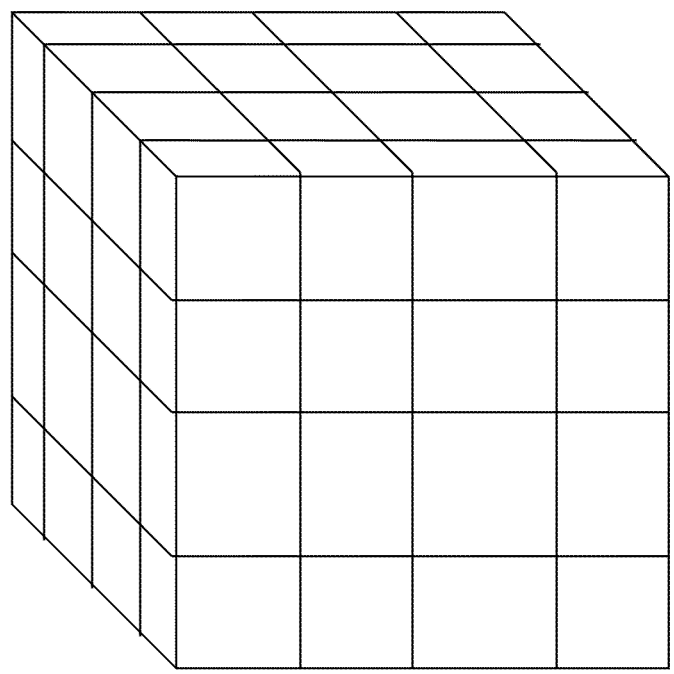
FIG. 1 shows a three-dimensional array of values for representing volume data, wherein each value represents a single voxel (volume element)

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

In order to overcome the shortcomings of the previously-mentioned volume rendering methods, we present an optimal solution for achieving real-time, predictable response times for interactive volume rendering. We focus on volume rendering on cacheless systems.

A system and method according to the invention involves an intelligent scheme for determining which volume data needs to be in local storage to process a ray or set of rays without interruption due to queries for unavailable data. This scheme offers the highest performance and predictability, with the most efficient usage of limited memory. Preferably, the working set of data will be kept as close to the arithmetic logic unit (ALU) as possible.

Referring to FIG. 1, volumetric data can be logically represented as a three-dimensional array of data values. The data values can be of type unsigned char, unsigned short int, unsigned int, float, or double, depending on how the data was acquired. We extract a frustum view from a volume of data. A frustum is defined as the part of a solid, such as a cone or pyramid, contained between the base and a plane parallel to the base that intersects the solid; or the part of such a solid contained between two parallel planes intersecting the solid. Here we use a frustum view of the data formed from a series of separate bounding boxes formed at points along the initial rays cast into the volume.

A key concept in this method is the use of the frustum view and geometry of the volume to determine a list of addresses representing the relevant data to be processed for that part of the volumetric array. This concept is applicable to any system with a smaller memory footprint close to the processing elements which seems to be becoming more common with BG (background processing), GPUs (graphics processing units), and Cell/BE.

Figure 2:
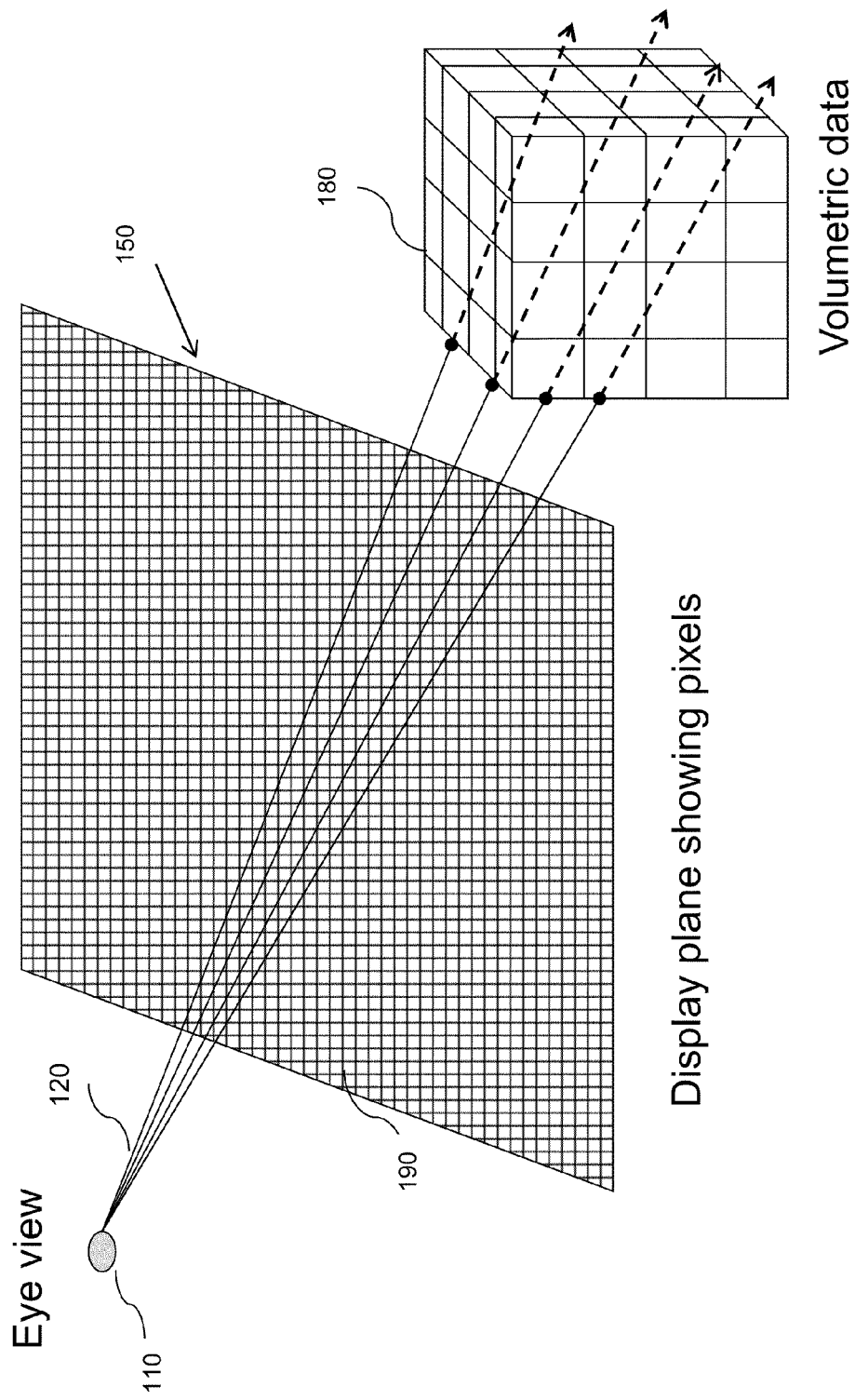
FIG. 2 shows four rays being cast from an eye through a display projection plane into a volume box, according to an embodiment of the present invention.

With reference to FIG. 2, we display four rays originating from an eye view 110 through a viewing plane 150 (most typically, a computer display system) composed of individual tiles 190 toward a logical bounding box 180 encompassing the volume. The eye view 110 is a starting point generally set by a user. The volume is represented with a bounding box. The relative size of the sides of the box is consistent with the size of the volume, i.e., if the volume is 256×256×128 voxels, the sides of the bounding box should have the same ratio of 2:2:1. The units and numerical range of the bounding box can be specified by the computer program as floating point values and are dependent on the coordinate system selected. This is variable and somewhat arbitrary based on programmer preference. The important factor is that the ratio of volume length to width to height (l:w:h) be maintained consistent with the acquired volume.

Each ray that is cast is logically represented as three parametric equations—$x(t)$, $y(t)$, $z(t)$ where t represents time. After the ray initially intersects with the virtual volume box at $t>0.0$, it is then incremented by some pre-determined (adjustable) step size and the x, y, z positions along the ray are determined. Voxels are sampled at each x, y, z position along the directional line and blended together using a variety of different transfer functions. The transfer functions are developed based on different image processing techniques that can be used to highlight colors, opacity levels, edges, and generally different aspects of the volume data. The determination of transfer functions is a science in itself and not the subject of this invention. The ray exits the bounding volume of the data when $t>1.0$.

The size of the bounding box is selected by first selecting a coordinating scene range. For example, you may want your scene to fit between −1.0 and 1.0 in each direction (x, y, z). Once you have selected a range, you map the volume to that range, maintaining the same ratio of length, width, and height. The size of the bounding box will depend on the size of the original 3D volume grid. In the example of FIG. 2 four rays are shown but the number of rays cast can vary. The number of rays is dependent on the microprocessor architecture of the computer system being used. For example, if the microprocessor architecture is optimized for vector instructions the algorithm may be able to compute multiple ray-bounding box intersections simultaneously, but it is generally preferable to cast the rays in groups of four because each group of four rays intersected with the logical volume box 180 at time t and t+delta t can be used to determine eight points which form the potential corners of a bounding box.

According to an embodiment of the present invention a ray casting algorithm is initiated by casting a plurality of rays originating from the eye view 110 through the viewing plane 150. The algorithm loads data for ray casting in a novel way regardless of the underlying microprocessor architecture or the memory subsystem. Referring now to FIG. 3, the algorithm accomplishes this by using a set of initial rays to determine a frustum area 350 of the volume bounding box 180. This frustum area 350 contains all of the voxel data needed to process a larger set of data with precision. The size of the frustum area is dependent on the amount of memory local to the microprocessor ALU. This can be variable for every device so although the algorithm can be applied to a variety of devices, the computer program must determine what the optimum amount of data is for each device. For example, if the local memory or cache is 32 kilobytes, then the frustum area should be chosen as to not exceed 32 kilobytes of data. Since we are computing addresses we can compute the amount of data between start and end addresses via simple arithmetic.

FIG. 3 shows the frustum view 350 extracted from a volume box 180 that was intersected by four rays cast from the eye point 110 into the volume box 180. The algorithm could be adapted to handle other numbers of rays and, as stated earlier, this is dependent on the microprocessor architecture being used by the underlying computer system. For example, if the microprocessor supported an eight-way single instruction multiple data stream (SIMD), the algorithm could cast eight rays simultaneously to determine the frustum of data.

With reference to FIG. 4, once the initial rays are cast and the frustum 350 of the volume box 180 is determined, the memory locations must be mapped. In the specific case of volume rendering this requires computing a set of three dimensional bounding boxes from sample intersection points along the ray. FIG. 4 shows a simplified two dimensional case which is simpler to visualize than the three dimensional case. The process is described at a high level in FIG. 5.

The process as it applies to the Cell/BE requires volumetric data as input. This data is stored in system memory as an array of voxels. The display surface 150 (e.g., LCD, CRT, and the like) is divided into sub regions, i.e. tiles (each tile is represented by a square in FIG. 2). Each synergistic processing element (SPE) executes the task of computing the pixels and their color attributes for the tiles. Tile size can be variable depending on workload balancing considerations or number of SPE resources available across the system. Tile processing may be distributed over several Cell/BEs, either locally or remotely connected. As each SPE begins processing a tile, the code will compute the intersection of multiple rays cast from the viewer's eye position into the scene containing the volumetric data (see FIG. 2).

With reference to now to FIG. 5, there is shown a pictorial representation of additional rays being cast. Once the memory address encompassed by the initial four rays (shown in bold) is loaded, the additional rays (shown as dotted lines) can be cast and processed without waiting for data to be loaded into memory. This is a significant performance advantage compared to previous methods.

FIGS. 6a, 6b, and 6c depict the sequence of events involved in computing the memory addresses for each iteration of ray casting. First, FIG. 6a shows multiple rays cast at the edges of the frustum. In FIG. 6b we see the 2D region 610 of the volume encompassed by the ray frustum, and FIG. 6c shows the 3D area 650 of the volume intersected by the ray frustum, shown as bounding boxes 650, according to an embodiment of the present invention.

The bounding boxes 650 represent "chunks" of memory that are computed based on the intersection of the four frustum rays with the volume. The size of these chunks 650 is dependent on the amount of memory available. Not all the chunks need to be moved into memory at once, but their address extents can be calculated by converting the floating point intersection into an integer array index.

Figure 7:
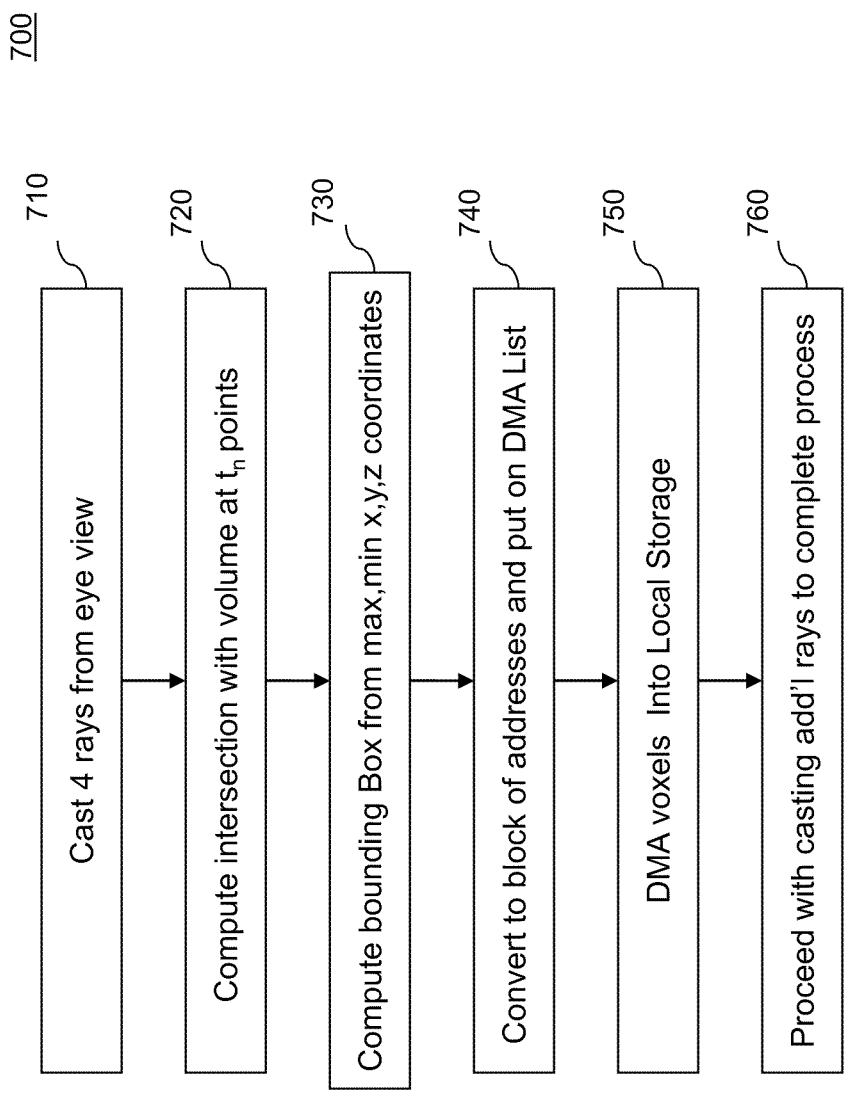
FIG. 7 is a flow chart of the method according to an embodiment of the present invention.

Referring to FIG. 7, a flow chart 700 illustrates a method according to an embodiment of the invention. Step 710 begins with the casting of a set of rays 120, as depicted in FIG. 2. These rays 120 are directional lines originating at the eye and extending toward the bounding volume box 180 that encloses the voxel data. The number of rays 120 can vary based on implementation details, but in the case of volume rendering there must be at least two rays 120.

Proceeding to step 720 we determine the points at which the rays 120 intersect with the volume box 180. This provides the frustum view 350 as depicted in FIG. 3. There are a variety of ways that this can be done, but fundamentally this is solved parametrically where $x(t)$, $y(t)$, and $z(t)$ represent three functions of time t that describe the begin and end points of each ray 120 as it moves from the eye view 110 toward the volume box 180. When t equals 0, then x, y, z also equal zero and the ray 120 is at the position of the eye view 110 (this is the begin point). When t equals 1, then x, y, z all equal the point that the ray 120 is at when it exits the volume box 180 that encloses the data (this is the end point). The ray directions are computed from the eye position which is set by the user and can be varied and the particular screen pixel positions that the ray 120 will pass through as it enters the scene to intersect with the volume box 180 (FIG. 1).

Each ray 120 has an entry point and an exit point for intersection with the volume. This results in eight intersections with the surface of the volume box 180, assuming each of the four rays 120 enters and exits the volume box 180 at different points. In practice this is done in 3D, but for illustrative purposes the two-dimensional case is shown (see FIG. 3). In the case that a ray 120 does not enter the volume 180 because the volume 180 would not intersect with the screen pixel position through which the ray 120 is passing, the corner of the volume 180 closest to that pixel position can be used as the entry point. Once the eight entry/exit points (two points for each ray 120) are determined, the addresses of the data in system memory can be determined and a DMA list can be composed (FIG. 3). Between t=0 and t=1 the ray 120 (at all points) is at some x, y, z location within the volume box 180. In basic terms, every x, y, z location "touched" by the ray 120 defines the outline of the frustum view 350. A fundamental construct of this algorithm is to sample the ray 120 at various times as it passes through the volume box 180. The number of times the ray 120 is sampled is directly related to the amount of memory for storing the data required to process the rendering of the volume box 180. Computer systems with very small memory will require less or smaller samples to be taken.

Sampling along a ray 120 consists of computing a value as time t increases from $t_0$, initial t value, when the ray 120 intersects the volume bounding box 180 to $t_1$ when the ray 120 exits the volume bounding box 180. At each increment of t, a new value is computed. The value is determined from the value of the specific voxel hit by the ray 120 and its surrounding values. The delta change in t impacts the number of times the volume 180 is sampled as the ray 120 moves through the volume 180. A smaller delta t means more samples.

Once the sample points have been determined as a function of the sample times, bounding boxes 410 through 450 are computed in step 730 by computing the addresses of the data needed based on the bounding box 410 formed by the intersection of multiple rays cast from the eye view 110 into the volume box 180 for a specific eye view 110 and screen pixel location. The eight entry/exit points form the three-dimensional corners of the bounding box 410. The process under discussion here does not interpolate the rays 120; rather the process computes the entry and exit intersections for the ray-volume intersection and uses that to calculate a bounding box 410 for the data that needs to be moved into local storage for another process (known in the art) to perform the ray interpolation and casting to proceed.

The bounding boxes 410 through 450 are computed from the minimum x, y, z values and maximum x, y, z values of two adjacent samples along the rays 120. Hence if four rays 120 are cast simultaneously there are eight x, y, z points representing the four intersections for the sample N and four intersections for sample N+1. The minima and maxima for each x, y, and z are determined and then used to form the corners of the bounding box 410. The process is repeated until all the samples along the rays 120 are taken and all the bounding boxes 410 through 450 have been formulated. These bounding boxes 410 through 450 together form the frustum view 350.

Once the bounding boxes 410 through 450 are determined, in step 740 the bounding boxes 410 through 450 are converted into memory locations. This can be implemented in a variety of ways, but the fundamental concept is to use the x, y, z coordinate of each corner of the bounding box 410 through 450 and map the coordinate to a voxel position. The voxel position is used as an offset to the beginning memory location of the volumetric data stored in memory. The memory addresses are used to compose a DMA list.

In step 750, the memory offsets are used to move the volume data into the local storage, preferably a small synergistic processing element (SPE) local store that will be needed by the specific ray casting and interpolation scheduled to be performed by a synergistic processing unit (SPU). The data is moved into local storage using the direct memory access (DMA) list from step 740. This scheme is an improvement over previous schemes because it can move all the data required to process all of the rays for a particular tile once so that the ray interpolation process is not interrupted, and hence achieve higher performance.

In this scenario, the output of step 740 is a set of memory locations and sizes. The size is determined from the memory locations. Start and end addresses can be used to compute the size in bytes, i.e. address end minus address start equals number of bytes. Each location is a start point and each size represents the number of data bytes that should be accessed. This set is formed into a list or a vector of addresses and lengths. The list or vector is used as an input parameter into the memory subsystem to fetch data to be loaded into local or private memory. Once the data is loaded, additional rays 120 are cast to process the data.

The procedure is repeated until all the rays 120 for an area are processed and all the tiles 190 on the display surface 150 have been covered. The additional rays are cast to process all the voxel data that has been loaded into local store, cache, or register memory. The original rays 120 are used to determine the starting point for the memory locations of the data that needs to be loaded.

This method is ideally suited for the Cell Broadband Engine™ (Cell/BE) because Cell/BE supports a gather direct memory access (DMA) function that will allow the data from discontiguous memory locations to be DMAed into local storage with a single command, i.e. DMA list command. Once a DMA list is constructed and data is DMAed into local store, the synergistic processing units (SPUs) can then perform ray interpolation to process all the data required to determine the pixel attributes for the tile 190 they are currently processing. The advantage of this scheme is that all the data that the SPE needs to process each tile 190 is in local storage during the entire time slice needed to process the tile 190. There are no cache delays or interrupts required to get more data until the tile 190 is processed. The SPEs can work asynchronously and data parallelization can be achieved for best performance.

This method for providing volume rendering fetches all data into a small local SPE store that is used by a ray casting and interpolation scheme performed by the synergistic processing unit (SPU). It does this by computing the addresses of the voxel data needed based on a bounding box formed by the intersection of a number of rays cast from the eye into the virtual volume grid for a specific eye view and screen pixel location. There is no need to interpolate the rays at this point. Instead, we compute the entry and exit intersections for the ray-volume grid intersections and use that to calculate bounding boxes for the data that needs to be moved into local storage for the ray interpolation and casting to proceed. It then moves that data using a DMA list into storage. This provides an improvement over previous schemes because it can move all the data required to process all the rays for a particular tile 190 of the grid at once so the ray interpolation process is not interrupted and thus achieve higher performance.

Figure 8:
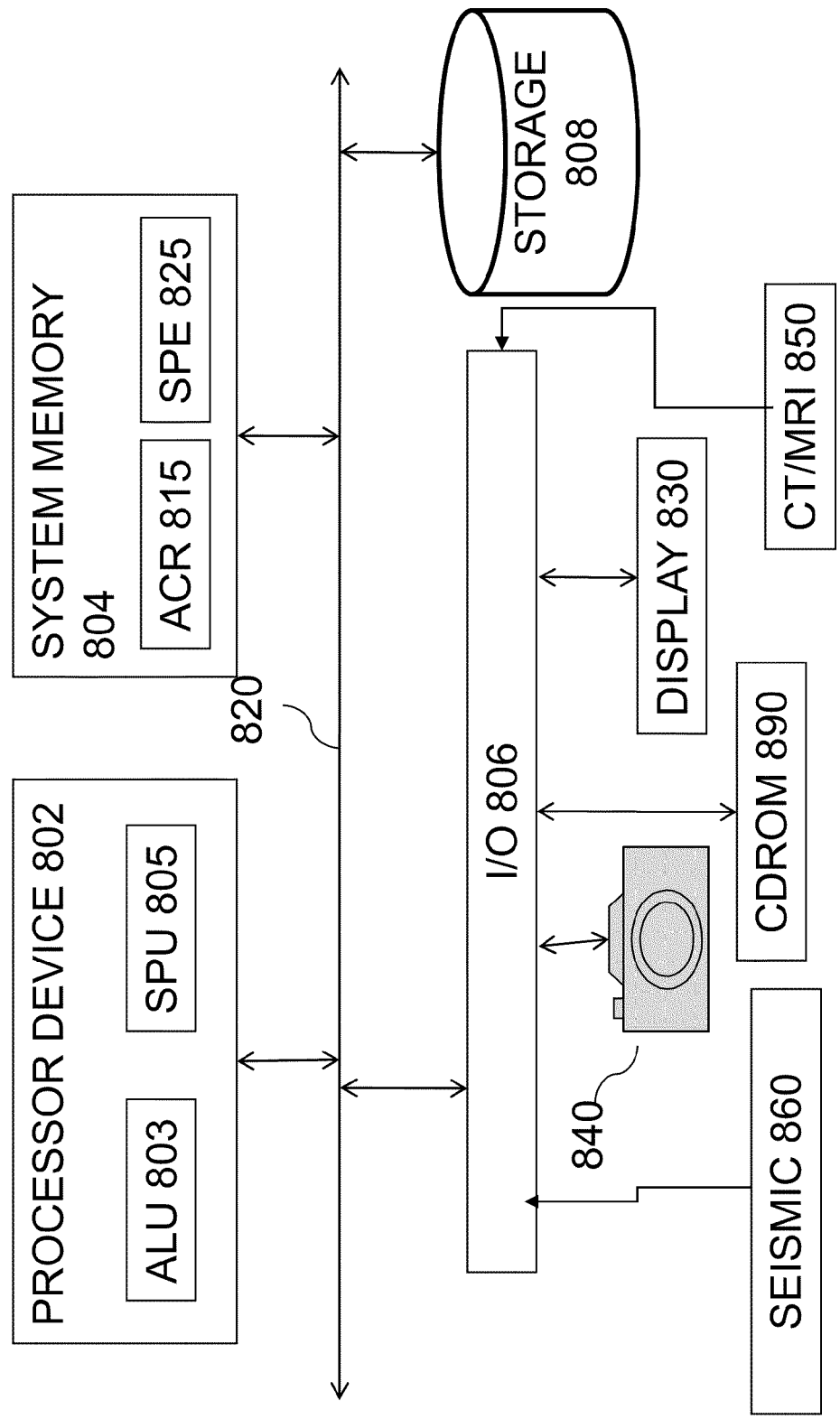
FIG. 8 is a block diagram illustrating an information processing system according to another embodiment of the invention.

With reference now to FIG. 8, a high-level pictorial representation of an information processing system in which the present invention may be implemented is depicted in accordance with certain presently preferred embodiments of the invention. Computer system 800 may be a networked computing device in communication with other networked computing devices (not shown). As will be appreciated by those of ordinary skill in the art, a network may be embodied using conventional networking technologies and may include one or more of the following: local area networks, wide area networks, intranets, public Internet and the like.

Computer system 800 includes processing device 802 that executes the method steps of FIG. 7 by executing a program for accelerated volume rendering (ACR 815) stored in system memory 804. The program 815, when executed by the processor device 802, carries out the aforementioned functions, producing as output the DMA list which may be stored in a local synergistic processing element 825. The synergistic processing unit 805 then uses the DMA list to perform ray interpolation.

The system 800 communicates with various optional input devices and output devices through the input/output subsystem 806. Input devices may include, for example, a keyboard, a mouse, a scanner, an imaging system (e.g., a camera 840, CT/MR "computer tomography/magnetic resonance"850, Seismic device 860) or the like. Similarly, output devices may include display 830 for displaying pixel plane images (scenes), information display unit printers and the like. Examples of conventional I/O devices include removable and fixed recordable media (e.g., floppy disk drives, tape drives, CD-ROM drives, DVD-RW drives, etc.), touch screen displays and the like. Results from the volume rendering may be written to a file or to a display (imaging) device.

The system 800 may also include a number of other peripheral devices, including the mass storage device 808 (e.g., a disk drive). The processor device 802 is a hardware general or special purpose microprocessor operating under control of computer program instructions executed from a memory 804. The processor device 802 may include a number of special purpose sub-processors such as an ALU 803 and SPU 805, or a GPU (graphical processing unit), each sub-processor for executing particular portions of the computer program instructions. Each sub-processor may be a separate circuit able to operate substantially in parallel with the other sub-processors. Some or all of the sub-processors may be implemented as computer program processes (software) tangibly stored in memory 804 that performs their respective functions when executed. These may share an instruction processor, such as a general purpose integrated circuit microprocessor, or each sub-processor may have its own processor for executing instructions. The components are interconnected via at least one bus such as bus 820 (shown here). It should be noted that other buses, or other permutations of interconnectivity fall within the scope of this discussion.

Alternatively, some or all of the sub-processors may be implemented in an ASIC. RAM may be embodied in one or more memory chips. The memory may be partitioned or otherwise mapped to reflect the boundaries of the various memory subcomponents.

What has been shown and discussed is a highly-simplified depiction of a programmable computer apparatus. Those skilled in the art will appreciate that a variety of alternatives are possible for the individual elements, and their arrangement, described above, while still falling within the scope of the invention. Thus, while it is important to note that the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of signal bearing media include ROMs (read-only memories), DVD-ROMs (digital video disks), and transmission-type media, such as digital and analog communication links, wired or wireless communications links using transmission forms, such as, for example, radio frequency and light wave transmissions. The signal bearing media make take the form of coded formats that are decoded for use in a particular data processing system.

According to another embodiment of the invention, a computer readable medium, such as a CDROM 890 may include the accelerated volume rendering program 815. The CDROM 890 can include program instructions for operating the programmable computer 800 according to the invention. What has been shown and discussed is a highly-simplified depiction of a programmable computer apparatus. Those skilled in the art will appreciate that other low-level components and connections are required in any practical application of a computer apparatus.

Therefore, while there has been described what is presently considered to be the preferred embodiment, it will understood by those skilled in the art that other modifications can be made within the spirit of the invention. The above descriptions of embodiments is not intended to be exhaustive or limiting in scope. The embodiments, as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

I claim:

1. A method for performing accelerated volume rendering of a scene in a computer system, said method comprising:
using a processor device, performing:
loading volumetric data comprising voxel data into a first part of a system memory, the volumetric data represented as a three-dimensional array of data values;
representing the three-dimensional array as a virtual volume box in a same ratio as the three-dimensional array;
casting a set of sample rays through a screen pixel position of the scene from an eye view to intersect the virtual volume box, wherein the scene is represented as a two-dimensional array of screen pixel positions;
determining entry and exit intersection points of each of the sample rays cast through the screen position and intersecting the virtual volume box, and wherein the intersection points are determined as a function of sample times from beginning to end of each sample ray, wherein a beginning sample time is a time at the sample ray first intersected the virtual volume box and an ending sample time is a time at which said sample ray exits the virtual volume box;
using the entry and exit intersection points, computing a set of three dimensional bounding boxes from sample intersection points along each ray, wherein said entry and exit intersection points form corners of the bounding boxes;
wherein each bounding box represents a chunk of memory for placement into a second part of the system memory, wherein the second part is smaller than the first part;
wherein each bounding box comprises all volumetric data needed to perform ray interpolation;
converting the bounding boxes into memory locations;
loading the volumetric data encompassed by each bounding box into the second part of the system memory; and
for all sets of sample rays that are cast, repeating the determining, computing, converting, and loading steps for all sample times from beginning to end.

2. The method of claim 1 wherein computing the three dimensional bounding box is based on a size of the second part of the memory.

3. The method of claim 2 wherein the step of converting the bounding box comprises:
computing corners of the three-dimensional bounding box formed from maximum and minimum x, y, z ray-volume points of intersections; and
converting the x, y, and z coordinates of each bounding box to a block of addresses.

4. The method of claim 3 wherein converting the x, y, and z coordinates comprises:
mapping the x, y, and z coordinates of each of the corners of the bounding box to a voxel position in the three-dimensional array to determine memory offsets and lengths for the subset of the three-dimensional array to be loaded into the second part of the memory; and
using the voxel position as an offset to a beginning memory location.

5. The method of claim 4 wherein the loading step comprises writing the block of addresses to the second part of memory as voxels, wherein said second part of the memory comprises local storage.

6. The method of claim 5 wherein mapping the x, y, and z coordinates comprises:
   using the coordinates x, y, and z to represent three functions of time t to describe begin and end points of the sample ray as it moves from the eye view through the three-dimensional array, such that when t equals zero the sample ray is at the eye view and $x_t$, $y_t$, and $z_t$ equal zero; and
   when t equals 1, the sample ray exits the volumetric data and $x_t$, $y_t$, and $z_t$ equal 1; and
   wherein between t=0 and t=1 the sample ray is at an x, y, and z location within the volumetric data.

7. The method of claim 5 wherein the data is moved using a direct memory access list into the local storage.

8. The method of claim 1 wherein the eye view is set by a user.

9. The method of claim 4 wherein the mapping step further comprises when one of the sample rays passing through a screen pixel position of the scene does not intersect the three-dimensional array, using a corner of the three-dimensional array closest to that screen pixel position as the beginning sample time.

10. The method of claim 3 wherein two x, y, and z coordinates are computed for each sample ray cast, one x, y, and z coordinate representing the beginning sample time t and one x, y, and z coordinate representing sample time t+dt, where dt is some change in t specified by a user.

11. A system for performing accelerated volume rendering of a scene in a computer system, said system comprising:
   a system memory for storing volumetric data, said system memory comprising at least a first part and a second part, wherein said second part is smaller than said first part;
   a processor device operatively coupled with the system memory for:
      loading volumetric data comprising voxel data into a first part of the system memory, the volumetric data represented as a three-dimensional array of data values;
      representing the three-dimensional array as a virtual volume box in a same ratio as the three-dimensional array;
      casting a set of sample rays through a screen pixel position of the scene from an eye view to intersect the virtual volume box, wherein said scene is represented as a two-dimensional array of screen pixel positions;
      determining entry and exit intersection points of each of the sample rays cast through the screen position and intersecting the virtual volume box, and wherein the intersection points are determined as a function of sample times from beginning to end, wherein a beginning sample time is a time at which one of the sample rays first intersected the three virtual volume box and an ending sample time is a time at which said sample ray exits the virtual volume box;
      using the entry and exit intersection points, computing a set of three dimensional bounding boxes from sample intersection points along each ray, wherein said entry and exit intersection points form corners of the bounding boxes;
      wherein each bounding box represents a chunk of memory for placement into the second part of the system memory, wherein said bounding box comprises all volumetric data needed to perform ray interpolation;
      converting the bounding boxes into memory locations;
      loading the volumetric data encompassed by each bounding box into the second part of the system memory; and
      for all sets of sample rays, repeating the determining, computing, converting, and loading steps for all sample times from beginning to end.

12. The system of claim 11 wherein a size of the bounding box is based on a size of the second part of the memory.

13. The system of claim 11 further comprising an imaging device used for displaying results of the volume rendering.

14. The system of claim 11 wherein the processor device converts the bounding box into a memory location by:
   computing corners of the three-dimensional bounding box formed from the maximum and minimum x, y, z ray-volume points of intersections; and
   converting the x, y, and z coordinates of each bounding box to a block of addresses.

15. The system of claim 14 wherein the processor device executes the converting by:
   mapping the x, y, and z coordinates of each of the corners of the bounding box to a voxel position in the three-dimensional array to determine memory offsets and lengths for the subset of the three-dimensional array to be loaded into the second part of the memory; and
   using the voxel position as an offset to a beginning memory location.

16. The system of claim 15 wherein the processor device further loads the volumetric data encompassed by the bounding box into the second part of the memory by writing the block of addresses to the second part of memory as voxels, wherein said second part of the memory comprises local storage.

17. The system of claim 16 wherein the processor device further maps the x, y, and z coordinates by:
   using the coordinates x, y, and z to represent three functions of time t to describe begin and end points of the sample ray as it moves from the eye view through the three-dimensional array, such that when t equals zero the sample ray is at the eye view and $x_t$, $y_t$, and $z_t$ equal zero; and
   when t equals 1, the sample ray exits the volumetric data and $x_t$, $y_t$, and $z_t$ equal 1; and
   wherein between t=0 and t=1 the sample ray is at an x, y, and z location within the volumetric data.

18. The system of claim 15 wherein the processor device further maps the x, y, and z coordinates by:
   when one of the sample rays passing through a screen pixel position of the scene does not intersect the three-dimensional array, using a corner of the three-dimensional array closest to that screen pixel position as the beginning sample time.

19. The system of claim 14 wherein the processor device further computes two x, y, and z coordinates for each sample ray cast, one x, y, and z coordinate representing the beginning sample time t and one x, y, and z coordinate representing sample time t+dt, wherein dt is some increment of time specified by a user.

20. The system of claim 16 wherein the processor device further loads the volumetric data from the bounding box into the local storage using a direct memory access list.

21. The system of claim 20 further comprising a synergistic processing unit for performing ray interpolation using the direct memory access list.

22. The system of claim 20 wherein the local storage comprises a synergistic processing element.

23. A non-transitory computer readable storage medium comprising computer program instructions for performing accelerated volume rendering using a computer by:
loading volumetric data comprising voxel data into a first part of a system memory, the volumetric data represented as a three-dimensional array of data values;
representing the three-dimensional array as a virtual volume box in a same ratio as the three-dimensional array;
casting a set of sample rays through a screen pixel position of a scene from an eye view to intersect the virtual volume box, wherein said scene is represented as a two-dimensional array of screen pixel positions;
determining entry and exit intersection points of each of the sample rays cast through the scene and intersecting the virtual volume box, and wherein the intersection points are determined as a function of sample times from beginning to end, wherein a beginning sample time is a time at which one of the sample rays first intersected the virtual volume box and the ending sample time is a time at which said sample ray exits the virtual volume box;
using the entry and exit intersection points, computing a set of three-dimensional bounding boxes from sample intersection points along each ray, wherein said entry and exit intersection points form corners of the bounding boxes;
wherein each bounding box represents a chunk of memory for placement into a second part of the system memory comprising local storage, wherein the second part is smaller than the first part;
wherein the bounding box comprises all volumetric data needed to perform ray interpolation;
converting the bounding boxes into memory locations;
loading the volumetric data encompassed by each bounding box into the second part of memory; and
for all sets of sample rays cast by the processor device, repeating the determining, computing, converting, and loading steps for all sample times from beginning to end.

24. The non-transitory computer readable storage medium of claim 23 further comprising computer program instructions for converting the bounding box by:
computing corners of the three-dimensional bounding box formed from maximum and minimum x, y, z ray-volume points of intersections; and
converting the x, y, and z coordinates of each bounding box to a block of addresses by:
mapping the x, y, and z coordinates of each of the corners of the bounding box to a voxel position in the three-dimensional array to determine memory offsets and lengths for the subset of the three-dimensional array to be loaded into the second part of the memory; and
using the voxel position as an offset to a beginning memory location.

25. The non-transitory computer readable storage medium of claim 24 further comprising program instructions for loading the volumetric data encompassed by the bounding box into local storage by writing the block of addresses to the second part of memory as voxels, wherein said second part of the memory is local storage.

26. The non-transitory computer readable storage medium of claim 25, further comprising program instructions for mapping the x, y, and z coordinates by:
using the coordinates x, y, and z to represent three functions of time t to describe begin and end points of the sample ray as it moves from the eye view through the three-dimensional array, such that when t equals zero the sample ray is at the eye view and $x_t$, $y_t$, and $z_t$ equal zero; and when t equals 1, the sample ray exits the volumetric data and $x_t$, $y_t$, and $z_t$ equal 1; and
wherein between t=0 and t=1 the sample ray is at an x, y, and z location within the volumetric data.

* * * * *